Dec. 6, 1966  G. D. CONKLIN  3,289,285
MACHINE FOR REMOVING BRAKE LINING
Filed June 24, 1964  2 Sheets-Sheet 1

INVENTOR.
GEORGE D. CONKLIN
BY
Lyon & Lyon
ATTORNEYS

Dec. 6, 1966 G. D. CONKLIN 3,289,285
MACHINE FOR REMOVING BRAKE LINING
Filed June 24, 1964 2 Sheets-Sheet 2

INVENTOR.
GEORGE D. CONKLIN
BY
Lyon & Lyon
ATTORNEYS

3,289,285
MACHINE FOR REMOVING BRAKE LINING
George D. Conklin, Torrance, Calif., assignor, by mesne assignments, to George D. Conklin, doing business as Conklin Equipment Co., Gardena, Calif.
Filed June 24, 1964, Ser. No. 377,637
4 Claims. (Cl. 29—233)

This invention relates to machines for removing brake lining, more particularly to machines for removing brake lining which has been riveted to a brake shoe. Included in the objects of this invention are:

First, to provide a machine into which brake shoes may be readily and quickly fed, whereupon the brake lining is automatically severed from the brake shoe.

Second, to provide a machine for removing brake shoes which utilizes a shearing knife adapted to ride on the surface of the brake shoe and is forced under the brake lining for engagement with the rivets, and wherein cam means is provided for automatically raising the knife clear of the leading edge of the brake shoe as the leading edge is fed past the knife.

Third, to provide a machine for removing brake shoes which incorporates a novel feed wheel arranged to permit rapid manual mounting of brake shoes thereon, and a retainer wheel operable, as the feed wheel is rotated, to retain the brake shoe thereon for engagement by the shearing knife.

Fourth, to provide a machine for removing brake shoes wherein safety means is provided operable to stop the machine, if the brake shoe is not properly placed or the operator's fingers should be in the path of movement of the brake shoe.

With the above and other objects in view, as may appear hereinafter, reference is directed to the accompanying drawings in which.

Figure 1:
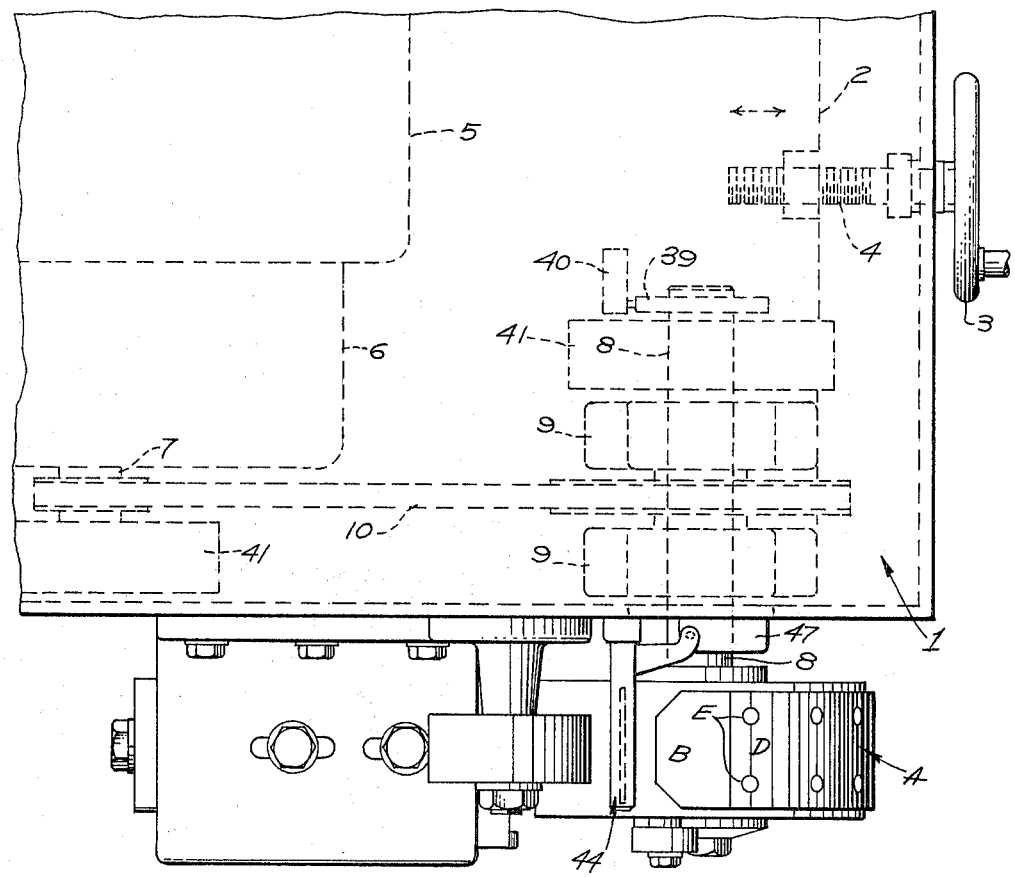
FIG. 1 is a fragmentary top view of the machine for removing brake lining with the driving mechanism, which is concealed in the housing, shown substantially diagrammatically and in dotted outline.

The machine for removing brake lining includes a boxlike housing 1 in which is mounted an adjustale carriage 2 capable of being moved lineally a limited distance by means of a handwheel 3 and a screw shaft 4.

The carriage 2 carries a motor 5 and speed reduction unit 6 having an output drive shaft 7. A driven shaft 8 is mounted between bearings 9 on the carriage 2 in spaced relation to the drive shaft 7. A drive means 10, such as a belt, cog belt, or chain, intersects the two shafts 7 and 8.

The driven shaft 8 projects horizontally from the housing 1 and is provided with a hub 11 which removably supports a cylindrical feed wheel 12. The periphery of the feed wheel 12 is provided with a brake shoe receiving slot 13, at one circumferential extremity of which is a transverse drive bar 14.

Supported from the side of the housing 1, rearwardly of the feed wheel 12, is a fixed bracket 15 having a horizontal flange 16. Disposed under the flange 16 is a slide carriage 17 of channel-shaped cross section and including a web 18 disposed contiguous to the flange 16. Rib and slot means 19 guide the slide carriage 17 in a path that is radial to the feed wheel 12.

The flange 16 and the slide carriage 17 are provided with bosses 20 and 21, which receive a screw shaft 22 so that the slide carriage 17 may be adjusted in a direction radial to the feed wheel 12. Locking screws 23 operating in slots within the flange 16 serve to secure the slide carriage 17 in a selected, adjusted position.

The slide carriage 17 includes depending flanges 24 at the opposite sides of the web 18. These flanges are triangular in side aspect, increasing in depth toward the feed wheel 12. At the end of the carriage 17, adjacent the feed wheel 12, the flanges 24 pivotally support therebetween a cross bar 25.

Mounted on or formed integrally with the cross bar 25 is a knife holder 26 in the form of a channel laterally dimensioned to fit between the depending flanges 24. The knife holder 26 includes a web 27 and upturned flanges 28 which increase in depth toward the feed wheel 12.

Resting on the web 27 between the upturned flanges 28, at the end of the knife holder 26 adjacent the feed wheel 12, is a knife 29 having a beveled, upwardly directed, knife edge 29a. The knife 29 is backed by an attachment shoulder 30, forming a part of the web 27, and is removably secured to the shoulder 30 by screws 31. A slot 32 is provided in the web 27 behind the knife 29.

The webs 18 and 27 are connected at their ends remote from the feed wheel 12 by tension springs 33. Movement of the webs 18 and 27 toward each other is limited by a stop screw 34.

One of the upturned flanges 28 is provided at its edge directed toward the feed wheel 12 with a cam 35. Mounted on the feed wheel 12 is a cam-engaging wheel 36 which, as the feed wheel is rotated, engages the cam 35 to tilt the knife 29 away from the periphery of the feed wheel 12.

Mounted above the knife 29 is a brake shoe retaining wheel 37 rotatably supported by a bracket 38 secured to the side of the housing 1. The retaining wheel 37 is so located as to clear by a small margin a brake shoe A carried by the feed wheel 12.

Mounted on the driven shaft 8 is a cam wheel 39 which, on each revolution, operates a cam switch 40. Mounted on the shafts 7 and 8 are electric brake units 41 which, when energized, stop rotation of their respective shafts. While one brake unit 41 is shown mounted on the drive shaft 7, it should be understood that this brake unit can be mounted on the shaft of the motor 5.

A foot or handwheel is located on the floor or on the housing 1 in a location convenient for engagement by the foot or hand of the operator.

In order to prevent insertion of one's fingers between the retaining wheel 37 and the feed wheel 12 or to insure that the brake shoe A is in proper position, there is provided in front of the retaining wheel 37 a safety guard 43 which includes a tiltable shaft 44 and depending guard plate 45. An arm 46 extends from the shaft 44 for engagement with a safety switch 47.

The brake shoe A for which the machine is adapted includes an arcuate rim B joined by a radially, inwardly directed web C. A brake lining D is secured to the outer surface of the arcuate rim B by rivets E.

Figure 2:
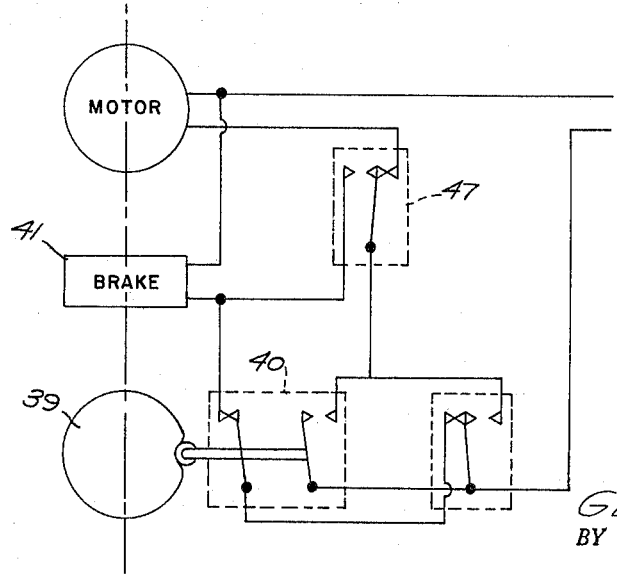
FIG. 2 is a simplified wiring diagram showing the electrical control for the machine.
Figure 3:
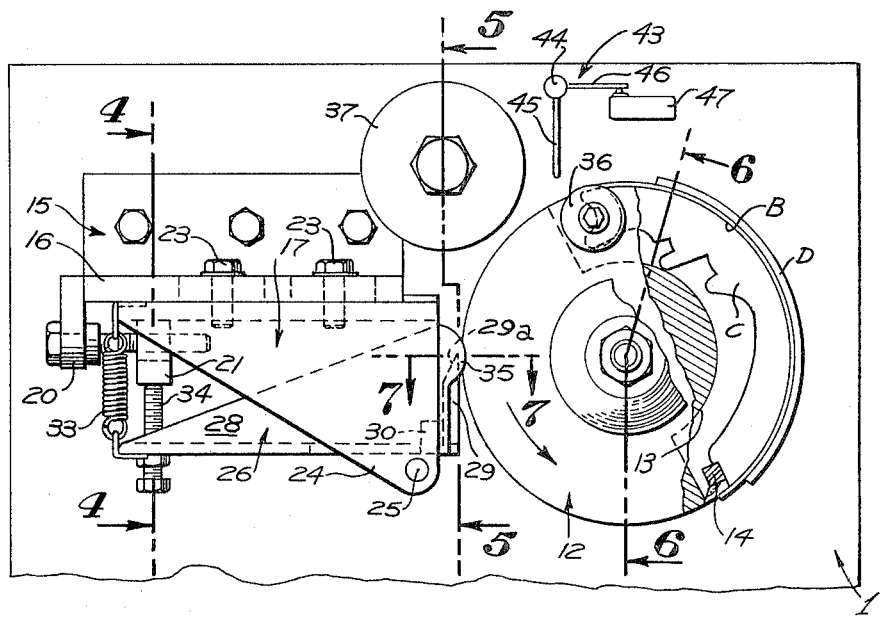
FIG. 3 is a fragmentary front view of the machine with portions shown in section.
Figure 4:
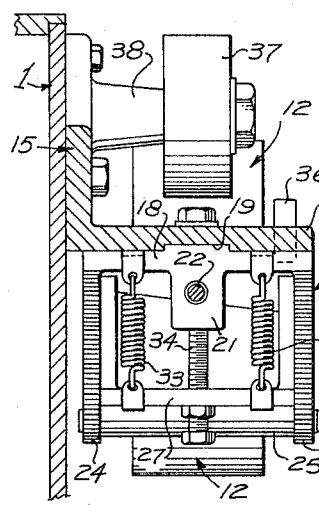
FIG. 4 is a fragmentary, transverse, sectional view taken through 4—4 of FIG. 3.
Figure 5:
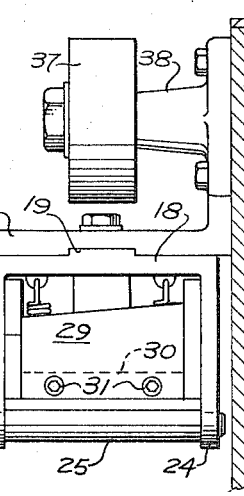
FIG. 5 is a fragmentary, transverse, sectional view taken through 5—5 of FIG. 3.
Figure 6:
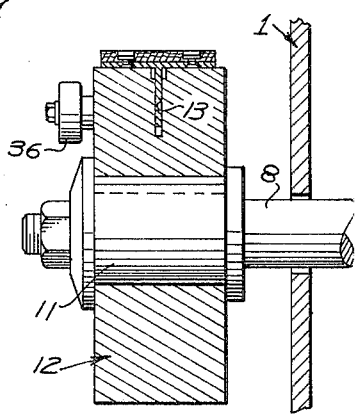
FIG. 6 is a fragmentary sectional view taken through 6—6 of FIG. 3.
Figures 7, 8, 9:
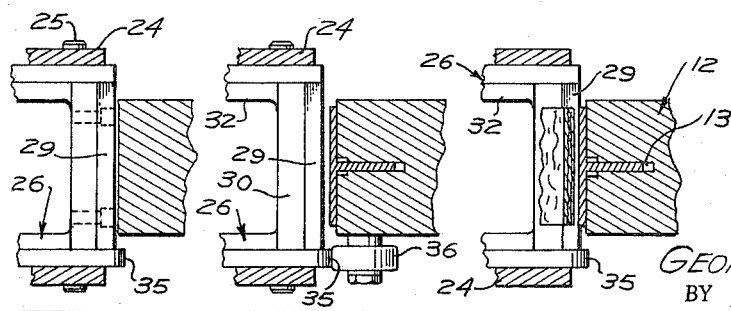
FIG. 7 is a fragmentary sectional view taken through 7—7 of FIG. 3, showing the shearing knife and feed wheel in their relative relation before transport of the brake shoe into engagement with the knife.
FIG. 8 is a similar fragmentary, sectional view showing the manner in which the knife is raised clear of the leading end of the brake shoe.
FIG. 9 is a similar fragmentary, sectional view showing the brake lining being severed therefrom.

Operation of the machine for removing brake lining is as follows:

When the feed wheel 12 is in substantially the position shown in FIG. 3, the electrical condition of the machine is essentially that shown in FIG. 2; that is, the motor 5 is de-energized. The brakes, however, may be energized. The brake shoe A is manually placed on the feed wheel 12 so that its arcuate rim B enters the slot 13, and one circumferential end of the web C bears against the drive bar 14.

When the hand or foot switch is operated, the circuit through the brake units 41 is broken, and the circuit through the motor 5 is established, causing the feed wheel 12 to rotate in a counterclockwise direction as indicated in FIG. 3. Counterclockwise rotation of the feed wheel 12 causes the brake shoe A and lining D to pass under the retaining wheel 37 and in a direction toward the edge 29a of the knife 29.

As the leading extremity of the arcuate rim B approaches the knife edge 29a, the cam 35 is engaged by the wheel 36 to tilt the edge 29a of the knife 29 away from the feed wheel 12 so as to clear the arcuate rim B. Immediately on passage of the cam wheel 36 the edge 29a of the knife is urged into scraping or sliding engagement with the surface of the arcuate rim B and is held thereagainst by the springs 33. Continued movement of the feed wheel 12 forces the knife edge 29a under the lining, stripping the lining from the rim of the brake shoe.

As the rivets 8 engage the knife edge 29a, they are severed. The stripped brake lining D, which breaks into segments, and the outer portions of the severed rivets 8 fall through the slot 32 into a suitable collector, not shown.

The brake shoe A, after passing the knife 29, is carried under the feed wheel 12 so that the brake shoe A tends to drop by gravity free of the feed wheel 12 and may be permitted to fall into a suitable collector or be caught by the operator. When the feed wheel 12 has completed its cycle of operation, a second brake shoe A is fitted thereon and the cycle is repeated. While it is desirable, it is not essential that the motion of the feed wheel 12 be stopped with each cycle, as a new shoe may be inserted as soon as the previous shoe has fallen free and there is sufficient free travel of the wheel to permit proper placement of the brake shoe.

The safety guard 43 is so arranged that if the guard plate 45 is engaged by the fingers of the operator or by a misplaced end of the brake shoe, the motor is de-energized and the brake units 41 are energized so that the feed wheel 12 comes to an immediate stop; thus preventing injury to the operator. Similarly, if the brake shoe is not seated properly on the feed wheel 12, and its entering end is raised too high from the surface of the feed wheel 12, the brake shoe will engage the guard plate 45 and cause the feed wheel to stop.

In order to accommodate brake shoes of different diameters, feed wheels of different sizes are mounted on the driven shaft 8 and the carriage 2 is adjusted so as to move the driven shaft 8 to or from the knife 29 to accommodate the changed size of the feed wheel 12. Alternatively, or in conjunction with adjustment of the location of the feed wheel 12, the knife 29 is adjusted radially of the feed wheel by means of the adjustment afforded between the carriage 17 and the flange 16. With each size of feed wheel 12 there is a corresponding size of retaining wheel 37 which is substituted for the retaining wheel illustrated.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A machine for removing brake lining from the arcuate rim of a brake shoe, said machine comprising:
   (a) a housing having a vertical side wall;
   (b) a first carriage movable in said housing;
   (c) a shaft and drive means therefor mounted on said carriage, said shaft protruding through said side wall;
   (d) a feed wheel carried on the protruding end of said shaft and adapted to receive a brake shoe and lining and interchangeable with similar feed wheels of different diameters;
   (e) a bracket mounted on said vertical side wall;
   (f) a second carriage carried by said bracket and adjustable to and from said feed wheel to accommodate feed wheels of different diameters;
   (g) a knife pivotally supported by said second carriage in an upwardly facing position;
   (h) a cam disposed at one lateral side of said knife and fixed relative thereto;
   (i) and a cam wheel disposed at a corresponding side of said feed wheel and located at the leading edge of said brake shoe rim, for engagement with said cam to cause said blade to clear the leading edge of said brake shoe rim and thereafter engage said rim.

2. A machine for removing brake lining from the arcuate rim of a brake shoe, said machine comprising:
   (a) a feed wheel mounted for rotation about a horizontal axis and having a brake shoe receiving and positioning means initially located at the forward side of said feed wheel;
   (b) a retaining wheel disposed above and rearwardly of said feed wheel to hold a brake shoe rim and lining on the periphery of said feed wheel as said brake shoe passes over said feed wheel and under said retaining wheel during rotation of said feed wheel;
   (c) a knife disposed tangent to said feed wheel at the rear side thereof under said retainer wheel for engagement with the rim of said brake shoe as said brake shoe passes downwardly beyond said retaining wheel during rotation of said feed wheel, said receiving and positioning means adapted, as said brake shoe rim clears said knife on rotation of said feed wheel, to release said brake shoe for gravity discharge from said feed wheel;
   (d) a camming element fixed to said knife at one side thereof;
   (e) and a cooperating camming element carried by said feed wheel and disposed opposite the leading edge of said brake shoe in said camming elements being mutually engageable as the leading of said brake shoe rim approaches said knife to lift said knife clear.

3. A machine for removing brake lining from the arcuate rim of a brake shoe, said machine comprising:
   (a) a feed wheel mounted for rotation about a horizontal axis and having a brake shoe receiving and positioning means initially located at the forward side of said feed wheel;
   (b) a retaining wheel disposed above and rearwardly of said feed wheel to hold a brake shoe rim and lining on the periphery of said feed wheel as said brake shoe passes over said feed wheel and under said retaining wheel during rotation of said feed wheel;
   (c) a vertically extending knife disposed tangentially to said feed wheel and having an upper cutting edge engageable with the rim of said brake shoe as said brake shoe passes downwardly beyond said retaining wheel during rotation of said feed wheel;
   (d) said receiving and positioning means adapted, as said brake shoe rim clears said knife on rotation of said feed wheel, to release said brake shoe for gravity discharge from said feed wheel;
   (e) means pivotally supporting said knife at its lower margin to permit movement of the cutting edge of said knife to and from said feed wheel;
   (f) a camming element fixed to said knife at one side thereof;
   (g) and a cooperating camming element carried by said feed wheel and disposed opposite the leading edge of said brake shoe in said camming elements being mutually engageable as the leading of said brake shoe rim approaches said knife to lift said knife clear.

4. A machine for removing brake lining from the arcuate rim of a brake shoe, said machine comprising:
 (a) a feed wheel mounted for rotation about a horizontal axis and having a brake shoe receiving and positioning means initially located at the forward side of said feed wheel;
 (b) a retaining wheel disposed above and rearwardly of said feed wheel to hold a brake shoe rim and lining on the periphery of said feed wheel as said brake shoe passes over said feed wheel and under said retaining wheel during rotation of said feed wheel;
 (c) a knife disposed tangent to said feed wheel at the rear side thereof under said retainer wheel for engagement with the rim of said brake shoe as said brake shoe passes downwardly beyond said retaining wheel during rotation of said feed wheel, said receiving and positioning means adapted, as said brake shoe rim clears said knife on rotation of said feed wheel, to release said brake shoe for gravity discharge from said feed wheel;
 (d) means for forceably rotating said feed wheel;
 (e) a brake for stopping said feed wheel;
 (f) and a control for said brake disposed above said feed wheel and forwardly of said retaining wheel and operative on engagement of a misplaced brake shoe or other object to stop rotation of said feed wheel.

References Cited by the Examiner
UNITED STATES PATENTS

| | | | |
|---|---|---|---|
| 2,630,176 | 3/1953 | Kelley et al. | 156—584 |
| 2,674,309 | 4/1954 | Gibelow | 156—584 |
| 2,818,149 | 12/1957 | Martell | 192—130 |

ANDREW R. JUHASZ, *Primary Examiner.*